March 22, 1932.  H. M. GUINOT  1,850,836
PROCESS FOR THE MANUFACTURE OF ACETAL
Filed Dec. 29, 1927
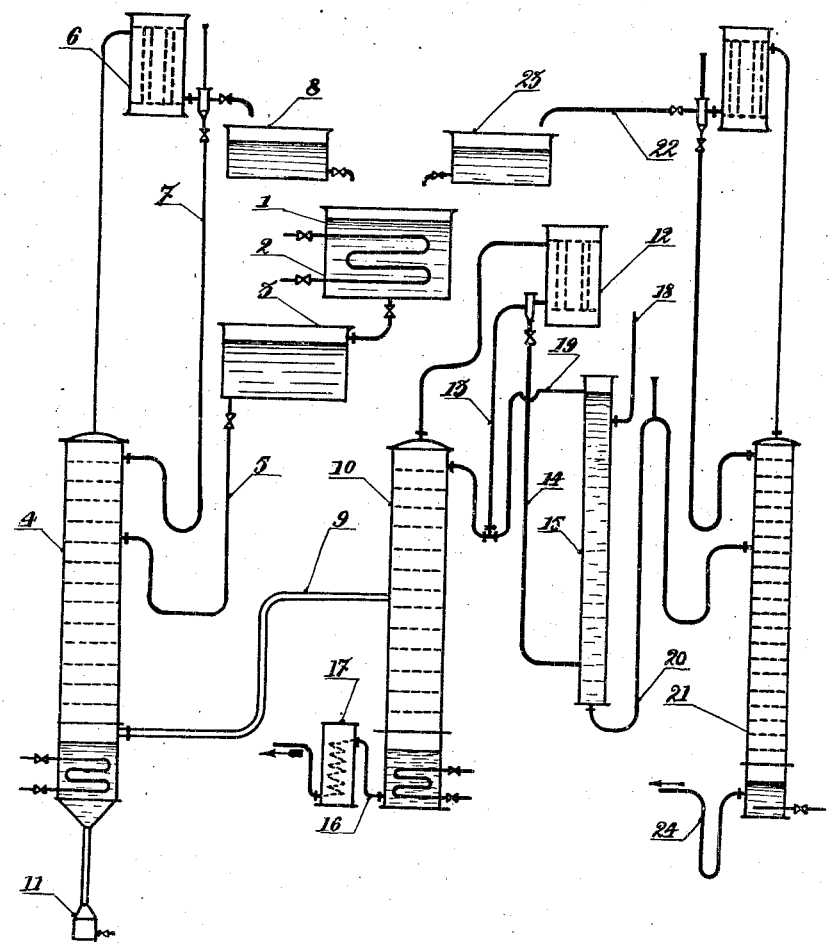

Patented Mar. 22, 1932                                                                    1,850,836

UNITED STATES PATENT OFFICE

HENRI MARTIN GUINOT, OF MELLE, FRANCE, ASSIGNOR TO SOCIETE ANONYME DES DISTILLERIES DES DEUX-SEVRES, OF MELLE, DEUX-SEVRES, FRANCE

PROCESS FOR THE MANUFACTURE OF ACETAL

Application filed December 29, 1927, Serial No. 243,386, and in Belgium January 3, 1927.

The preparation of di-ethylic acetal by the use of ordinary alcohol and of acetaldehyde, or its polymers, has already been considered in various scientific papers, but the operating methods proposed have not offered altogether satisfactory results.

The operation is usually performed as follows:—

Alcohol and aldehyde are placed together, the reaction being produced by means of a certain quantity of a catalyst, such as hydrochloric, sulphuric, toluene sulphonic, or acetic acids, hydrogen phosphide, calcium chloride, various metallic salts, or the like. Acetal is formed, and the production stops at the state of equilibrium: Alcohol+acetaldehyde ⇌ acetal+water; so that the reaction medium contains the four products. The acetal has a boiling point of 104.2 degrees C. which is much higher than that of the other liquid constituents used, so that it would appear to be an easy matter to separate it from these latter by distillation, for the said substances would be distilled over, while the acetal would remain. Unfortunately, acetal forms in the first place with alcohol alone, and in the second place with alcohol and water, azeotropic mixtures, rich in acetal, whose boiling points are below 78.3 degrees, and hence during the distillation the major part of the acetal will be brought over in these mixtures, and at the end of the distillation, but a small amount, in the pure state, will remain.

To obviate this difficulty, two principal methods have been hitherto proposed.

One of these consists in the use of certain salts, such as calcium chloride, to absorb the water which is formed (in this case it has already served as a catalyst for the reaction).

This results in the formation of a layer which has been made rich in acetal, which is purified by washing with water, drying by calcium chloride, and rectifying. However, this method of proceeding has a disadvantage, in that it leads to the formation of aqueous solutions containing greater or less proportions of all the substances used, and this will much complicate the treatment. As a definite result, the output of pure acetal is only 65 per cent.

The second method consists in adding to the mixtures in the reaction, liquids which are insoluble in water, such as gasoline. This causes the separation of an aqueous layer and a layer rich in acetal. The latter is purified by washing and rectifying. In this method, the yield of acetal is increased, but it is necessary to proceed with laborious recovery operations by distillation, in order to attain the 90 per cent yield specified by the author.

I have devised the improved process, the subject-matter of the present invention. The said process comprises the following features.

1. The use of a quantity of acid to start the reaction, which is only from $\frac{1}{5}$ to $\frac{1}{10}$ of that generally used in ordinary practice; this small quantity suffices to cause the production of acetal, and it has further the advantageous result of reducing to a minimum the quantity of salt formed after the acid has been neutralized. Otherwise stated, and as clearly appears from the example given below, the quantity of acid used is approximately equal to 0.03 percent of the quantity (by weight) of the materials used.

2. The acid is neutralized by a weak alkali or by a reagent adapted to produce an alkaline reaction until the obtainment of a very slight alkaline effect with bromothymol blue; all acidity which might cause the decomposition of the acetal during the distillation, and all alkalinity greater than that above indicated which might cause the resinification of the substances, must be avoided.

3. The continuous separation of the pure acetal by distillation in three stages.

The first stage consists in removing, by distillation, the whole of the acetaldehyde and also a part of the alcohol, leaving as a residue the acetal, the water and the remainder of the alcohol; the second stage consists in the removal of this residue of water and alcohol by distillation, by the use of an auxiliary liquid insoluble in water, which forms with the water and alcohol a mixture having a minimum boiling point, leaving pure acetal as a residue of this distillation; the third stage consists in recovering from the resulting mixture having the minimum boiling point the auxiliary liquid, by washing, and the alcohol, by distillation, and in causing them to enter the cycle of operations.

The following example of the said process with reference to the appended drawing, shows the principles of the said invention.

To the vessel 1 is supplied—cooling effectively by means of the worm 2—92 kgs. of alcohol at 100 degrees C. and 45 kgs. of acetaldehyde, to which is added 45 grams (that is to say the $\frac{1}{1000}$ of the weight of the acetic aldehyde in use) of gaseous HCl in the form of acid at 22 degrees B. After 2 hours of contact, the reaction is complete, and the mixture contains acetal. The mass is carefully neutralized by adding the proper quantity of sodium bicarbonate, until the solution becomes slightly alkaline as shown by bromothymol blue. The liquid thus neutralized is emptied into a recipient 3, and the same operation is repeated in the vessel 1, so as to constantly supply the said recipient which is used for the feeding of the continuous distillation system.

The upright distilling apparatus 4, provided with surface heating, is regularly supplied with the liquid from the recipient 3 through the pipe 5. The heating and the back action are so regulated that the whole of the acetaldehyde—and if necessary a part of the alcohol—will be brought over by the distillation. The vapours of these liquids condense in the condenser 6; a portion circulates back through the pipe 7, and the remainder flows into the receptacle 8. There will descend to the lower part of the apparatus 4 a mixture of acetal, alcohol and water. By the use of a suitable heating, the said mixture is vaporized, and the mixture of vapours thus produced cannot ascend column 4 because it is driven back by the products flowing back from tube 7 (and which consist chiefly of acetaldehyde, a very volatile product) to the lower part of the column. Now in the lower part of any distillation column there is a pressure which is approximately equal to the sum of the heights of the liquids on the plates. The vapours of acetal, alcohol and water formed in the lower part of column 4 therefore issue preferably through tube 9 and enter the intermediate part of column 10, where the pressure is about one half of that in the lower part of column 4. The salt contained in the liquid,—some 85 grams of sodium chloride per 100 kgs. of acetal obtained—will be precipitated and is collected in a vessel 11 in the usual manner.

In the apparatus 10 is preliminarily placed a certain quantity of benzine which serves as an auxiliary liquid so that the said liquid will be distributed on about ⅔ of the upper part of the said apparatus. Under the effect of the surface heating there will be produced an azeotropic mixture of benzine, alcohol and water which is then condensed in the condenser 12; a certain part of said mixture proceeds back through the pipe 13, and the remainder circulates through the pipe 14 into the lower part of the scrubber 15. The acetal descends to the bottom of the apparatus 10 and is discharged thence through the pipe 16; it is cooled in the cooling device 17. The condensed azeotropic mixture which enters the lower part of the scrubber 15, receives, by contrary flow, a slight amount of water through the pipe 18. The benzine settles, and it enters the distilling apparatus 10 through the pipe 19. The liquid issuing from the scrubber through the pipe 20 consists of water and alcohol; it enters the distilling apparatus 21, in which the alcohol is concentrated to 96 degress in the known manner, and then flows through the pipe 22 into the vessel 23. The residual water issues through the pipe 24.

The aldehyde, mixed with a small amount of alcohol, which is collected from the vessel 8, and the alcohol which is collected from the vessel 23, will serve again for the reaction in the vessel 1.

In this process, the yield is total, which means that the products which have not reacted are entirely recuperated and sent back into the apparatus together with the amounts of fresh products, so that there is no loss. Thus I obtain in the form of acetal, the whole of the products used in the reaction.

Obviously, modifications can be made in the process herein specified without departing from the principle of the invention.

What I claim is:—

1. Process for the manufacture of di-ethylic acetal from ethylic alcohol and acetic aldehyde including the use of one of the known acids usually employed as catalysts for that purpose, characterized by the fact that the condensation of the acetic aldehyde and the alcohol is effected by the use of a quantity of the acid used as catalyst which is equal to about 0.03 percent by weight of the materials used.

2. Process for the manufacture of di-ethylic acetal from ethylic alcohol and acetic aldehyde, characterized by the fact that the condensation of the acetic aldehyde and the alcohol is effected by the use as catalyst of a quantity of hydrochloric acid equal to about 0.03 percent by weight of the materials used.

3. Process for the manufacture of di-ethylic acetal from ethylic alcohol and acetic aldehyde including the use of one of the known acids usually employed as catalysts for that purpose, characterized by the fact that the condensation of the acetic aldehyde and the alcohol is effected by the use of a quantity of the acid used as catalyst which is equal to about 0.03 percent by weight of the materials used and in that the resulting solution is neutralized, when the equilibrium of the reaction is attained, by adding the strictly necessary amount of a weak alkali.

4. A process for the manufacture of diethylic acetal, which consists in condensing acetic aldehyde and alcohol in the presence of one of the known acids usually employed as catalysts for that purpose, in separating, by continuous distillation, from the products formed by the reaction, the acetic aldehyde and a part of the alcohol which has not reacted, so as to obtain as a residue, the acetal, the water, and the remainder of the alcohol, in distilling these latter products with an auxiliary liquid insoluble in water and forming with the water and alcohol a mixture having a minimum boiling point, in such manner as to obtain the acetal as a residue, in washing the said mixture having the minimum boiling point which issues from the second distillation in such manner as to remove the auxiliary liquid, and in subjecting the alcohol and water to a third distillation in order to eliminate the water, and in causing the alcohol to enter the cycle of operations.

5. A process for the manufacture of diethylic acetal, which consists in condensing acetic aldehyde and alcohol in the presence of one of the known acids usually employed as catalysts for that purpose, in neutralizing the resulting solution when the equilibrium of the reaction is obtained, in distilling the products of the reaction in such manner as to separate on the one hand the acetic aldehyde and a part of the alcohol which has not reacted, and to obtain on the other hand the acetal, the water, and the remainder of the alcohol, in again distilling these last-mentioned products with an auxiliary liquid which is insoluble in water and which forms with the water and alcohol a mixture having a minimum boiling point in such manner as to obtain on the one hand the acetal and on the other hand the said mixture having the minimum boiling point, in washing the said mixture to recover the auxiliary liquid, in distilling the remaining mixture of alcohol and water to remove the water, and in causing the alcohol to enter the cycle of operations.

6. A process for the manufacture of diethylic acetal, which consists in condensing acetic aldehyde and alcohol by means of a quantity of hydrochloric acid equal to 0.001 of the weight of the acetic aldehyde in use, in neutralizing the resulting solution, when the equilibrium of the reaction has been obtained, by adding the quantity of sodium bicarbonate strictly necessary, in distilling the products of the reaction so as to separate on the one hand the acetaldehyde and a part of the alcohol which has not reacted, and on the other hand to obtain as a residue the acetal, the water and the remainder of the alcohol, in causing the acetaldehyde to enter the cycle of operations, in distilling the residue with an auxiliary liquid insoluble in water which forms with the water and the alcohol a mixture having a minimum boiling point, in such manner as to obtain on the one hand the separated acetal at the bottom of the distilling apparatus and on the other hand the said mixture having a minimum boiling point, in washing this mixture discharged from the distilling apparatus with water in order to remove the auxiliary liquid, in subjecting the water and the alcohol to a third distillation in order to separate them from one another, and in causing the alcohol to enter the cycle of operations.

In testimony whereof I have signed this specification.

HENRI MARTIN GUINOT.